United States Patent
Zouani (10) Patent No.: US 10,473,185 B2
(45) Date of Patent: Nov. 12, 2019

(54) COUNTERBALANCE GEAR WITH SHOT DAMPER

(71) Applicant: Ford Global Technologies, LLC, Dearborn, MI (US)

(72) Inventor: Abdelkrim Zouani, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 217 days.

(21) Appl. No.: 15/643,627

(22) Filed: Jul. 7, 2017

(65) Prior Publication Data
US 2019/0011014 A1    Jan. 10, 2019

(51) Int. Cl.
*F16F 15/26*  (2006.01)
*F16H 55/17*  (2006.01)
*B23F 17/00*  (2006.01)
*B23P 15/14*  (2006.01)

(52) U.S. Cl.
CPC .......... *F16F 15/262* (2013.01); *B23F 17/00* (2013.01); *F16H 55/17* (2013.01); *B23P 15/14* (2013.01)

(58) Field of Classification Search
CPC ........ F16F 15/262; B23F 17/00; F16H 55/17; B23P 15/14
See application file for complete search history.

(56) References Cited

U.S. PATENT DOCUMENTS

| 5,078,575 | A  | * | 1/1992  | Haas ................. F04D 29/445 415/197 |
| 6,311,582 | B1 | * | 11/2001 | Chow ................. B25D 1/12 81/20 |
| 6,626,139 | B1 | * | 9/2003  | Horita ................ F16F 15/12 123/192.2 |
| 6,802,405 | B2 |   | 10/2004 | Barcock et al. |
| 7,004,294 | B2 |   | 2/2006  | Williams |
| 9,121,466 | B2 |   | 9/2015  | Tsugihashi et al. |
| 9,410,597 | B2 |   | 8/2016  | Manzoor |
| 2010/0294063 | A1 |   | 11/2010 | Schroth et al. |
| 2016/0017955 | A1 | * | 1/2016  | Sajdowitz ........... F16F 15/265 123/192.2 |

FOREIGN PATENT DOCUMENTS

CN   201145021 Y    11/2008
CN   101725656 A  *  6/2010
(Continued)

*Primary Examiner* — Jacob M Amick
*Assistant Examiner* — Charles Brauch
(74) *Attorney, Agent, or Firm* — Brooks Kushman P.C.; Geoffrey Brumbaugh (57) ABSTRACT

An engine system has a crankshaft gear coupled to an engine crankshaft and a balance gear coupled to a balance shaft. The balance gear is formed by a disc having first and second opposite sides and a series of teeth. A first sector of the disc has at least one aperture therethrough, and a second opposite sector of the disc defines a recess intersecting the first side. The balance gear has a damper formed by a cover plate connected to the first side to enclose the recess and contain a plurality of particles therein. A gear and a method of forming a gear is also provided, with the gear having a first sector defining at least one aperture therethrough and a second sector defining a recess intersecting the first side. A plurality of particles are positioned in the recess, and a cover plate encloses the recess to form a damper.

19 Claims, 7 Drawing Sheets

(56) References Cited

FOREIGN PATENT DOCUMENTS

| | | | |
|---|---|---|---|
| CN | 101725656 | A | 6/2010 |
| CN | 202165556 | U | 3/2012 |
| CN | 102410355 | A | 4/2012 |
| CN | 104141768 | A | 11/2014 |
| CN | 104196955 | A | 12/2014 |
| JP | H06288463 | A * | 10/1994 |
| JP | H06288463 | A | 10/1994 |
| WO | 2010117069 | A | 10/2010 |

* cited by examiner

COUNTERBALANCE GEAR WITH SHOT DAMPER

TECHNICAL FIELD

Various embodiments related to a counterbalance gear such as a counterbalance gear on a counterbalance shaft for an engine.

BACKGROUND

Gear drive systems often exhibit tonal noises and vibrations at the harmonics of the gear meshing frequency, and this may be caused by a change of the contact forces between the drive and driven gears as the gears rotate. The gear-to-gear interaction may result in noise commonly referred to as gear whine. Gear whine is mainly due to the transmission error between meshing teeth of the two gears and may be dependent on several factors including torsional load, gear design, tooth profile, total number of teeth, number of contacting teeth, gear mass, and inertia. Gear whine may be increased in cases with high torsional excitations and may be further exacerbated at various orders or harmonics based on the system dynamic.

SUMMARY

In an embodiment, an engine system has a crankshaft gear coupled to a crankshaft of an engine for rotation therewith. The engine system has a balance gear coupled to a balance shaft for rotation therewith, with the balance gear and crankshaft gear in meshed engagement. The balance gear is formed by a disc having first and second opposite sides extending radially outwardly to a circumferential edge defining a series of teeth. A first sector of the disc has at least one aperture therethrough, and a second opposite sector of the disc defines a recess intersecting the first side. The balance gear has a damper formed by a cover plate connected to the first side of the disc to enclose the recess and contain a plurality of particles therein.

In another embodiment, a gear for a vehicle shaft has a disc with first and second opposite sides extending radially outwardly to an edge defining a series of teeth. The disc has a first sector defining at least one aperture therethrough and a second sector defining a recess intersecting the first side and a plurality of particles positioned in the recess. A cover plate is connected to the first side of the disc to enclose the recess.

In yet another embodiment, a method of forming a balance gear for a vehicle balance shaft is provided. A disc is formed having first and second opposite sides extending radially outwardly to a circumferential edge. A series of teeth is formed on the circumferential edge. A single recess is formed into the disc, with the recess intersecting the first side of the disc and extending to a blind depth therein, the recess extending adjacent to the circumferential edge. At least one aperture is formed in the disc, with the at least one aperture intersecting the first and second sides of the disc and radially opposed to the recess. A plurality of shot particles is provided into the recess to a specified fill fraction. A cover plate is attached to the first side of the disc to enclose the recess, retain the plurality of shot particles therein, and form an internal damper in the balance gear. A volume of the internal damper, the specified fill fraction, and a diameter of shot particles are sized to damp whine caused by at least second orders of distortion of the balance gear.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicles commonly use intermeshed gears to transmit torque or power in the vehicle, and to operate various vehicle systems or components. The vehicle is provided with an internal combustion engine and a transmission system, each of which may include intermeshing gears. The various intermeshed gears, or gear trains, may exhibit tonal noises and vibrations at the harmonics of the gear meshing frequency. The teeth of the drive gear intermesh and contact with the teeth of the driven gear to rotate the driven gear, and gear whine is a result of a change of the contact forces between the drive and driven gears as the gears rotate. Gear whine may be caused by or increased by error or variability in the transmission of forces from the teeth of the drive gear to the teeth of the driven gear. For gears exhibiting a degree of flexibility in use, gear whine may be further amplified. Gear whine may be a function of various gear-to-gear operating parameters and states including torsional load, gear design, tooth profile, number of teeth, gear mass, and inertia.

Figure 1:
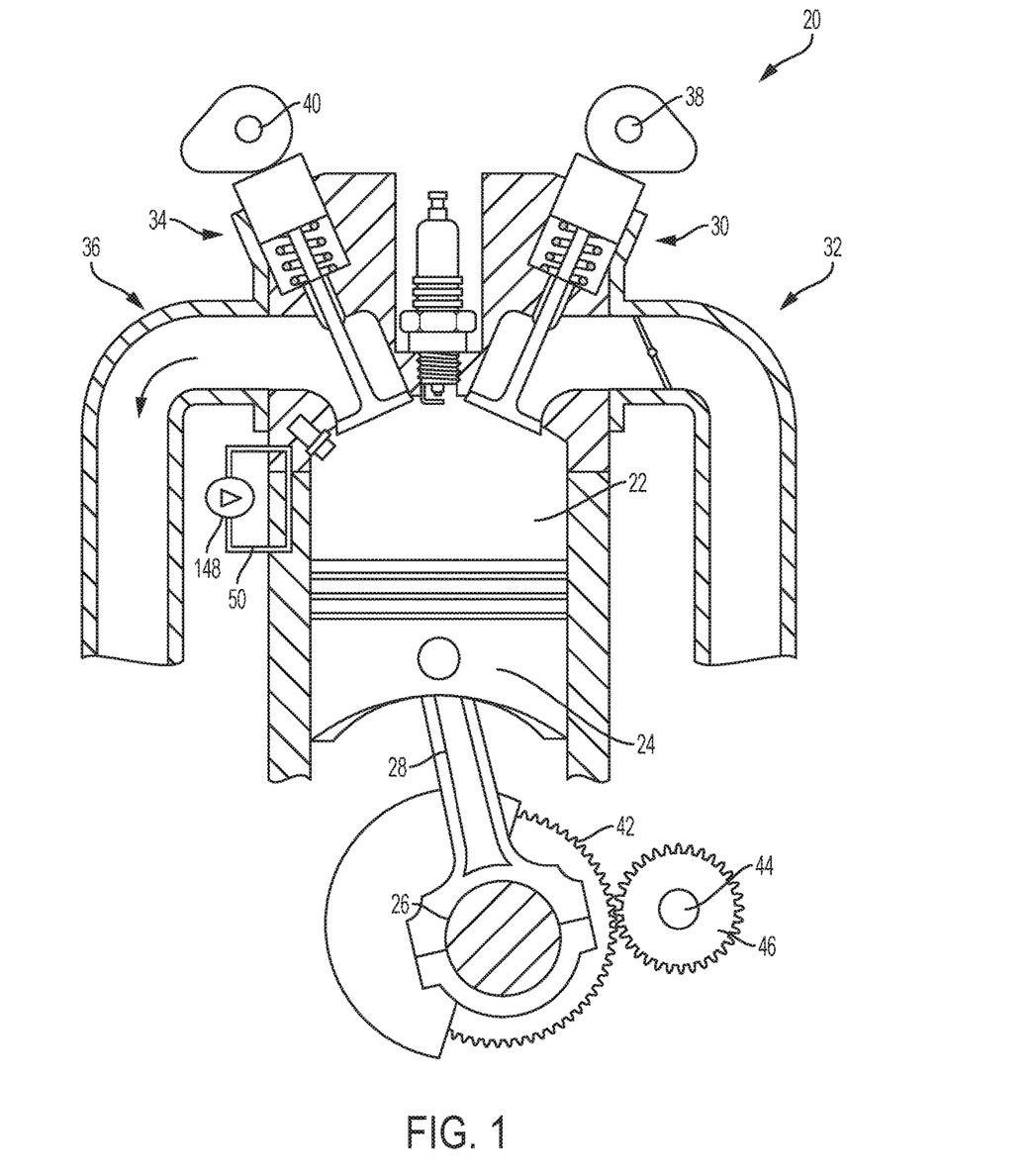
FIG. 1 illustrates a schematic of an internal combustion engine configured to implement various embodiments according to the present disclosure.

FIG. 1 illustrates a schematic of an internal combustion engine system 20 configured to implement various embodiments according to the present disclosure. In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

The engine 20 has a cylinder block and a cylinder head that cooperate to define a plurality of cylinders 22, with one cylinder is illustrated. The engine 20 may have one cylinder, two cylinders, three cylinders, four cylinders, or more than four cylinders. A piston 24 is positioned within each cylinder and is connected to a crankshaft 26 via a connecting rod 28.

One or more intake valves 30 controls flow from an intake manifold 32 into the cylinder 22. One or more exhaust valves 34 controls flow from the cylinder 22 to an exhaust manifold 36. The intake and exhaust valves 30, 34 may be operated in various ways as is known in the art to control the engine operation. The engine 20 is illustrated as having the intake valve 30 and exhaust valve 34 each with an associated camshaft 38, 40, respectively, in a direct overhead cam configuration. The engine and valves 30, 34 may be configured in various manners as is known in the art, for example, as a single overhead camshaft, dual overhead camshaft, direct camshaft actuation, an overhead valve configuration with the valves operated by pushrods or rockers, and the like. The camshafts 38, 40 may be rotationally connected to and driven by the crankshaft 26, and in one embodiment, are driven by a gear train according to the present disclosure as described below.

Each cylinder 22 may operate under a four-stroke cycle including an intake stroke, a compression stroke, an ignition stroke, and an exhaust stroke. In other embodiments, the engine may operate with a two stroke cycle. The piston 24 position at the top of the cylinder 22 is generally known as top dead center (TDC). The piston 24 position at the bottom of the cylinder is generally known as bottom dead center (BDC).

During the intake stroke, the intake valve(s) 30 opens and the exhaust valve(s) 30 closes while the piston 24 moves from the top of the cylinder 22 to the bottom of the cylinder 22 to introduce air from the intake manifold to the combustion chamber.

During the compression stroke, the intake and exhaust valves 30, 34 are closed. The piston 24 moves from the bottom towards the top of the cylinder 22 to compress the air within the combustion chamber.

Fuel is then introduced into the combustion chamber and ignited. The engine may be provided as a spark ignition engine or as a compression ignition engine. During the expansion stroke, the ignited fuel air mixture in the combustion chamber expands, thereby causing the piston 24 to move from the top of the cylinder 22 to the bottom of the cylinder 22. The movement of the piston 24 causes a corresponding movement in crankshaft 26 and provides for a mechanical torque output from the engine 20.

During the exhaust stroke, the intake valve(s) 30 remains closed, and the exhaust valve(s) 34 opens. The piston 24 moves from the bottom of the cylinder to the top of the cylinder 22 to remove the exhaust gases and combustion products from the combustion chamber by reducing the volume of the chamber. The exhaust gases flow from the combustion cylinder 22 to the exhaust manifold 36.

The intake and exhaust valves 30, 34 positions and timing, as well as the fuel injection timing and ignition timing may be varied for the various engine strokes.

The crankshaft 26 may be provided with a crankshaft gear 42 or drive gear. A balance shaft 44 may be provided with a balance gear 46 or driven gear in meshed engagement with the drive gear 42. The crankshaft 26 may have additional drive gears mounted thereon, or gear trains in meshed engagement with the drive gear to drive other engine or vehicle systems according to the present disclosure, including gear trains to drive the camshafts 38, 40, a pump 48 in a cooling or lubricating system 50 for the engine, a fuel pump, a supercharger or other forced induction system, a vacuum pump, an alternator, and the like.

Figure 2:
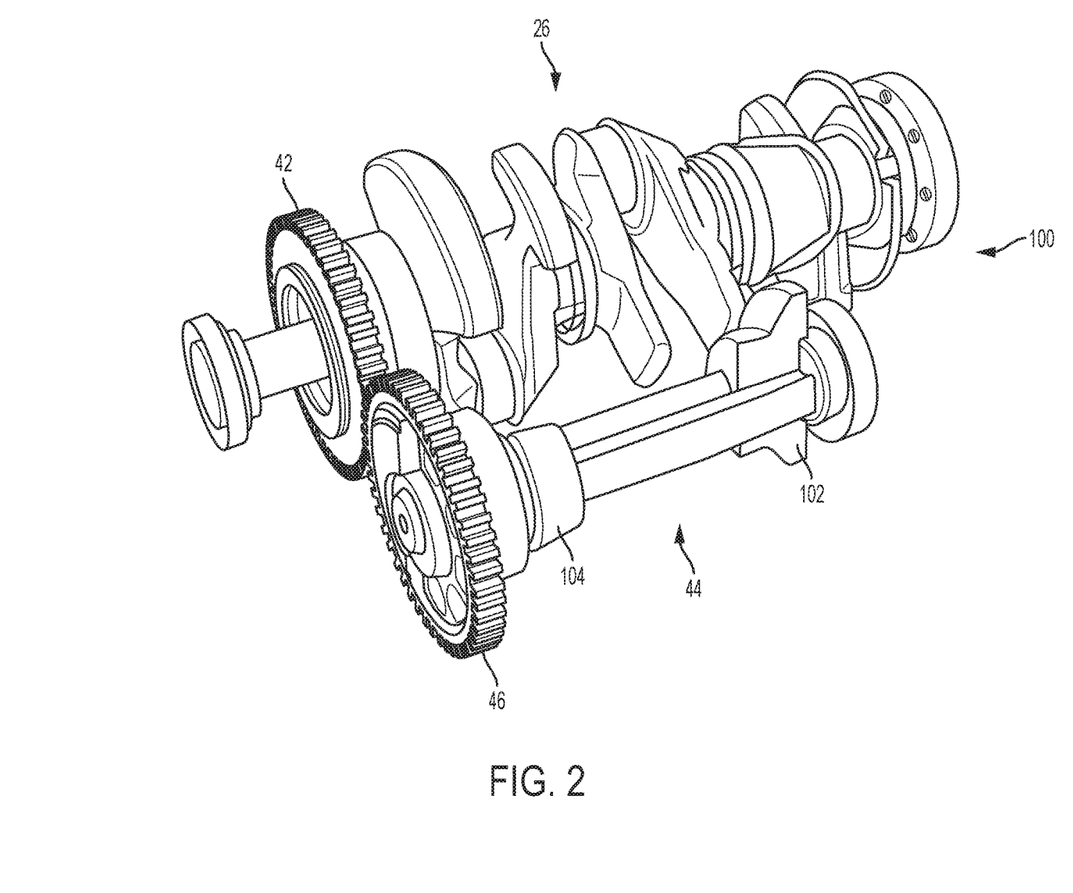
FIG. 2 illustrates a perspective view of a crankshaft and balance shaft assembly for the engine of FIG. 1.

FIG. 2 illustrates a perspective view of a crankshaft and balance shaft assembly 100 according to an embodiment and for use with the engine 20 of FIG. 1 in an in-line three cylinder configuration. Elements in FIG. 2 have the same reference numbers as similar elements in FIG. 1 for simplicity. In other examples, the crankshaft and/or the engine may have more than one balance shaft. The balance shaft 44 may be provided for an engine with asymmetry. For example, in an engine with one or more cylinders, the movement of the connecting rods may be asymmetrical throughout the crankshaft 26 rotation. For example, during a given period of crankshaft rotation, the descending and ascending pistons are not always completely opposed or balanced in their movement and acceleration, which results in inertial forces and/or couples or moments with each crankshaft revolution that may additionally increase with increasing engine and crankshaft speed. In one example, an in-line three cylinder engine has an inherent second order couple caused by the asymmetrical connecting rod movement, and balance shaft 44 may be needed based on the magnitude of the reciprocating cylinder masses. In other examples, an in-line four cylinder engine has an inherent second order force caused by the asymmetrical connecting rod movement, and balance shaft 44 may be needed based on the magnitude of the reciprocating cylinder masses. In another example, a six cylinder engine is provided with a V-configuration of two in-line cylinder banks, and the engine has an inherent second order couple caused by asymmetrical connecting rod movement, and one or more balance shafts may be provided for use with the engine.

The crankshaft 26 is shown as having a drive gear 42 or crankshaft gear coupled thereto for rotation therewith. The balance shaft 44 extends parallel to the crankshaft 26 and is eccentrically weighted. For the balance shaft 44 shown for use with an in-line, three cylinder engine, balance shaft has two eccentric counterweights 102, 104 or equal masses oriented at 180 degrees or opposite from each other, and placed at a certain distance from each other along the length of the balance shaft. In one example, the weight 102 is formed as an integral part of the balance shaft 44, and in other examples, is a weight 102 that is connected to the balance shaft 44 for rotation therewith. The second eccentric weight may be integrated into and provided by an eccentrically weighted balance gear 46, for example, based on packaging constraints or desired longitudinal spacing between the weights 102, 104. The second eccentric weight may be divided into two separate smaller portions that are both radially opposite to the first weight 102, with one portion of the second eccentric connected to or integrated into the balance shaft and the other portion of the second eccentric weight integrated into the eccentrically weighted balance shaft. Alternatively, the second eccentric weight may be supported solely by the balance shaft 44. The masses of the eccentric counterweights and the relative distance depend on the level of the couple that needs to be balanced. In further examples, the size and positioning (radial and longitudinal) of the counterweights on the balance shaft may be determined based on the level of the forces that needs to be balanced.

The balance shaft 44 has a driven gear 46 or balance gear connected thereto for rotation therewith. The drive gear 42 of the crankshaft is in meshed engagement with the driven gear 46 of a balance shaft such that rotation of the crankshaft 26 drives the balance shaft 44. The drive gear 42 and driven gear 46 may be selected to provide the desired gear ratio, and speed ratio for the balance shaft compared to the crankshaft. The drive gear 42 and driven gear 46 are provided as intermeshed spur gears or intermeshed helical gears. In some embodiments, the drive gear 42 and driven gear 46 are further provided as scissor gears to provide a biasing force to maintain engagement gears. According to one example, gear whine noises may increase for gear trains using scissor gears to prevent gear teeth separation under high torsional excitations, as the contact forces between the meshed gear teeth are even higher.

The driven gear 46 or balance gear in FIG. 2 and according to the present disclosure is counterweighted to provide balancing for the engine. The balance gear 46 may be counterweighted to provide the counterweight for the balance shaft assembly by itself and with a uniformly weighted balance shaft 44, or in conjunction with an eccentrically weighted balance shaft 44. In one example, the balance gear 46 is counterweighted based on packaging constraints for the balance shaft 44 in the engine compartment. By counterweighting the balance gear 46, additional NVH consideration may arise in the system, including gear whine and rattle, where rattle includes noise caused by variation in the gear center distance due to the inertia of the imbalance mass, gear skew and tilt due to the balance shaft dynamic.

Figure 3:
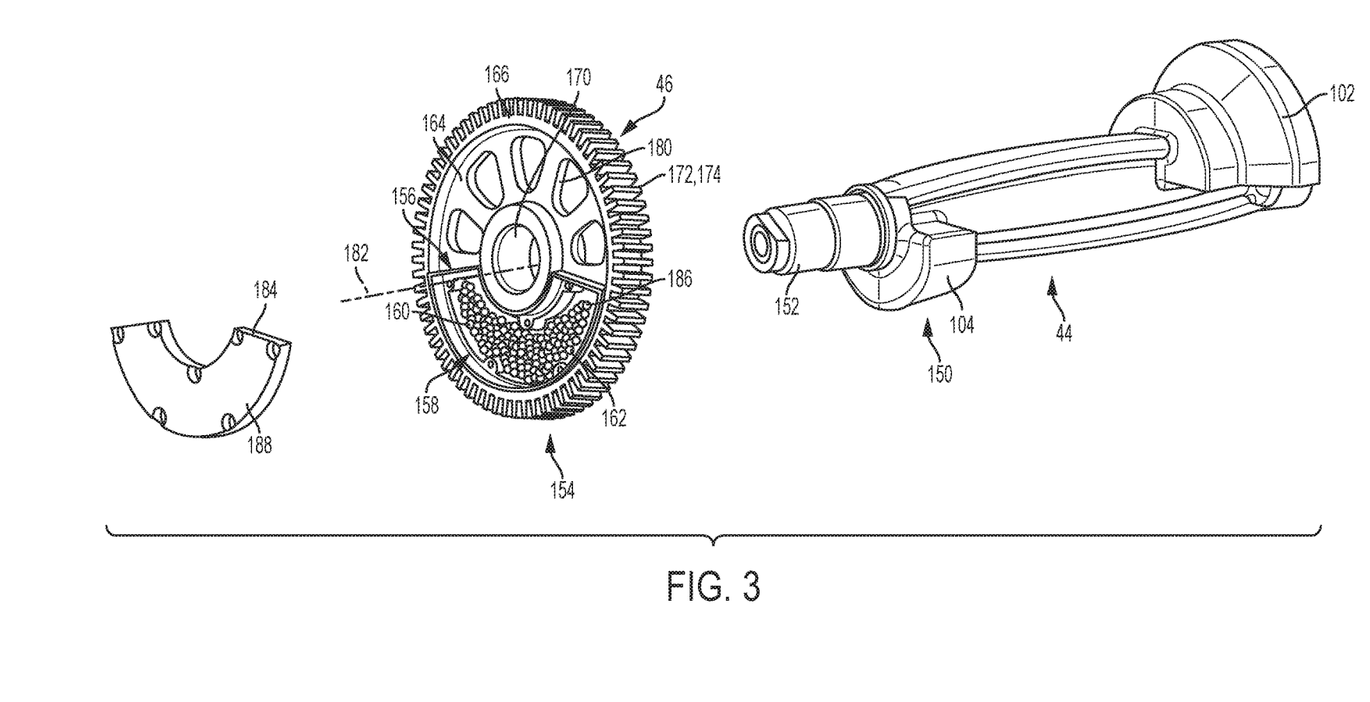
FIG. 3 illustrates an exploded view of a balance gear and balance shaft according to an embodiment.
Figure 4:
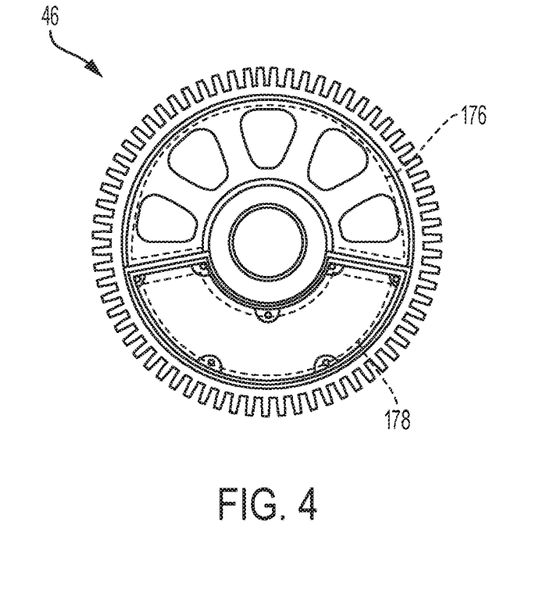
FIG. 4 illustrates a plan view of the balance gear of FIG. 3 with the cover plate removed.
Figure 5:
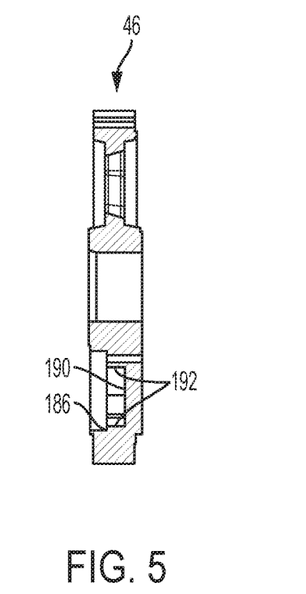
FIG. 5 illustrates a sectional view of the balance gear of FIG. 4.

FIGS. 3-5 illustrate a balance shaft assembly 150 including a driven gear 46 according to the present disclosure. The balance shaft assembly 150 may be used with the engine 20 of FIG. 1 or in the assembly 100 of FIG. 2. Elements in FIGS. 3-5 are given the same reference numbers as similar elements in FIGS. 1-2 for simplicity. It is envisioned that the driven gear 46 as described herein may be used as a counterweighted gear or gear in other vehicle applications, to counteract gear whine relating to gear flexibility. The driven gear 46 is connected to the nose 152 of the balance shaft 44. The driven gear 46 is counterweighted or eccentrically weighted to provide counterweight for the balance shaft 44 or additional counterweight for the balance shaft 44. The balance gear 46 according to the present disclosure integrates a particle damper 154 or shot damper into the flank 156 of the gear in a counterweight region 158 or imbalance mass of the gear. The balance gear may be a first order balance shaft gear. The shot damper 154 has a plurality of particles 160 or shot, which may be provided by small steel balls provided inside a container formed by the gear 46. Energy created by the flexible modes of the gear 46 is dissipated by friction losses, ball-to-ball impacts, and ball-to-gear wall impacts. The shot damper 154 provides for a broadband dissipation of noise, vibration, and harshness (NVH), and is not tuned to a specific frequency. The particle damper 154 is integrated into a pocket 162 or recess formed in the counterweight section 158 of the balance gear 46, and components of the particle damper 154 may be sized to maintain the original weight of the counterweight of the balance gear 46. By integrating the damper 154 into the balance gear, NVH, including gear whine, may be controlled and mitigated at the source. Additionally, the balance gear 46 with the integrated damper 154 as described herein is suitable for use in harsh environments, e.g. an engine compartment with high temperatures and circulating lubricant, where other conventional dampers such as those incorporating rubber materials would be unsuited.

As shown in FIG. 3, the balance shaft has counterweights 102, 104 that are provided radially opposite to one another, and longitudinally spaced apart along the balance shaft 44. The second counterweight is divided such that a portion of the counterweight 104 is formed with the balance shaft, and another portion of the counterweight 104 is provided by a counterweighted balance gear 46. In other examples, the counterweights 102, 104 may be otherwise provided as described above, and sized and positioned as required to balance the forces or couples of an associated engine configuration. The driven gear 46 or balance gear is formed by a disc 164 or disc member with first and second opposite sides 166, 168. The disc member 164 and first and second sides 166, 168 extend radially outwardly from a central aperture 170 to a circumferential edge 172 of the disc. The circumferential edge 172 of the disc extends between the first and second sides 166, 168 of the disc, and provides an outer perimeter of the balance gear 46. The outer circumferential edge 172 defines a series of teeth 174, and the teeth may be provided as teeth for a spur gear, a helical gear, or other gear type. In one example, as shown, the circumferential edge 172 extends generally perpendicularly to the first and second sides 166, 168, and parallel with the central aperture 170. In other examples, the circumferential edge 172 may be angled relative to the first and second sides 166, 168 and the central aperture 170, for example, as a bevel gear.

The body of the balance gear 46, or gear flank, has a first sector 176 and a second sector 178. In one example, the first and second sectors 176, 178 cooperate to provide 360 degrees of the body such that they are the only two sectors for the gear 46. The first sector 176 and second sector 178 are generally opposite one another. In one example, the first sector 176 ranges from 140 to 220 degrees of the disc, with the second sector 178 providing the remaining 220 to 140 degrees of the disc, respectively. In a further example, the second sector 178 may be smaller than 140 degrees. In another example, each sector 176, 178 may provide a half disc for the disc.

The first sector 176 of the disc has at least one aperture 180 formed therethrough and intersecting the first and second sides 166, 168. In other examples, as shown, the first sector 176 of the disc has a series of apertures 180 formed therethrough to intersect the first and second sides 166, 168 of the disc. The apertures 180 of the first sector 176 extend radially outward from the central bore 170 to remove mass from the disc 164 away from the longitudinal or rotational axis 182 of the gear. In further examples, the apertures 180 in the first sector 176 may be replaced by or provided in conjunction with recesses or slots intersecting one of the first and second sides 166, 168 to remove material from the body of the balance gear 46 in the first sector 176 away from the rotational axis 182.

The second sector 178 of the disc is provided with an internal particle damper 154 or shot damper formed therein. The body of the disc 164 has a pocket 162 or recess formed therein and intersecting one of the first and second sides 166, 168. In the example shown, the recess 162 intersects the first side 166 of the disc. The recess 162 or pocket is formed by the gear flank 156 or body in the second sector 178.

The balance gear 46 has a cover plate 184 connected to the first side 166 of the balance gear 46 to enclose the recess 162. The cover plate 184 may be connected or coupled to the balance gear 46 using fasteners in cooperation with a sealing member, such as an O-ring, a room-temperature-vulcanization (RTV) silicone gasket, or another gasket material with appropriate temperature resistance. The cover plate 184 may alternatively be connected to the first side 166 of the balance gear 46 via welding or another similar process. The cover plate 184 and disc 156 cooperate to form a fluid tight seal, for example, to prevent lubricant or other fluids from entering the damper 154 during use. The cover plate 184 may be provided with a thickness that is sized to provide a predetermined mass and weight for the cover plate 184, and such that the imbalance mass 158 for the gear 46 is unchanged compared to a conventional counterweighted balance gear without a damper 154.

A mating face 186 may be defined by the first side 166 and extend about a circumference of the recess 162 and directly adjacent to the recess 162. The mating face 186 may be recessed from the first side 166, and sized to receive the cover plate 184. In one example, the mating face 186 may be recessed such that an outer surface 188 of the cover plate 184 is flush or co-planar with the adjacent first side 166 of the disc in the second sector 178 when installed, or to reduce the protrusion of the cover plate 184 from the first side 166 of the gear. The mating face 186 may additionally be provided with a groove or other feature to receive a sealing member, and may have threaded apertures intersecting the face to receive fasteners used in connecting the cover plate to the balance gear.

The recess 162 may be formed as a blind pocket or recess within the disc 164 such that the recess is formed by an end wall 190 and a side wall 192. The end wall 190 is spaced apart from the second side 168 of the disc, and may be parallel to the first side 166 and the second side 168 of the disc. The side wall 192 intersects the first side 166 of the disc and extends from the end wall 190 to the first side 166 or to the mating surface 186 of the disc. In various embodiments, and as shown, the recess 162 is provided as the sole recess 162 in the disc receiving particles and enclosed by the cover plate, such that the balance gear 46 is formed with a single particle damper 154 therein.

A plurality of particles 160 is positioned within the recess 162 before the cover plate 184 is connected to the balance gear 46. The plurality of particles 160 may be provided by shot, and may be in the form of spherical balls. The plurality of particles 160 or shot may each be formed from a metal or metal alloy. In the example shown, the shot is provided by steel balls, which have both the material properties necessary for repeated impacts and the high operating temperature, and the density to contribute to the imbalance mass of the gear.

The cover plate 184 and the recess 162 cooperate to define an internal volume for the damper 154, or a container for the particles 160. The damper 154 is sized to improve the NVH performance by controlling the size or diameter of the particles 160 or shot, the size and shape of the damper 154 container, the location of the container and damper 154 on the gear 46, and the clearance or empty volume of the shot-filled damper 154, as known as a fill fraction. Primary factors affecting the performance of the damper 154 may be the volume of the damper, and the clearance or fill fraction of the damper. The damper 154 is generally positioned in the gear to be near the deformation region, e.g. radially outboard, and away from the rotational axis 182 of the gear. Generally, the performance of the damper 154 is increased with increasing damper 154 volume.

Figure 6:
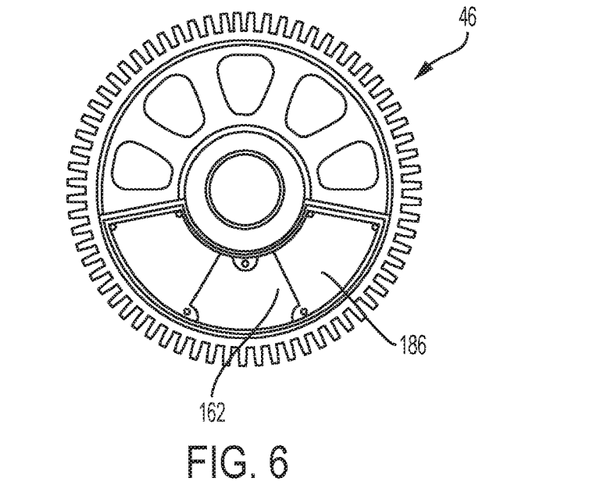
FIG. 6 illustrates a balance gear for use with the balance shaft of FIG. 3 according to an alternative embodiment.
Figure 7:
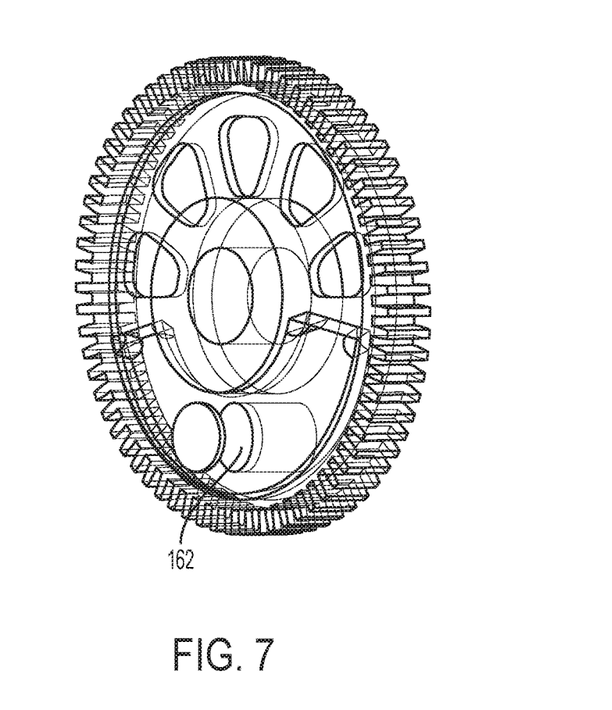
FIG. 7 illustrates a balance gear for use with the balance shaft of FIG. 3 according to another alternative embodiment.

The container is sized such that the volume of the container is in a range of 10-40 percent of the volume of the counterweight in the gear. In one example, the damper 154 volume is between four and twelve cubic centimeters. The damper 154 may be provided as a single damper 154 to provide the largest continuous volume for the damper in the gear 46, and increase performance and noise reduction. In other embodiments, multiple dampers 154 may be incorporated into the counterbalance region 158 of the gear based on other gear design constraints. The shape of the recess and damper container may also be varied. In the present example, the damper 154 has a cross-sectional shape of an annular sector to provide a large volume based on the gear shape, and to position the damper 154 away from the central aperture 170 and rotational axis 182 of the gear. The damper 154 is shown as having a constant depth or distance between the first side 166 and the end wall 190, however, in other examples, the depth of the damper 154 may be varied, e.g. with an angled, curved, or v-shaped end wall 190. In other examples, the damper 154 may have other cross section shapes, including circular, semi-circular, triangular, square, rectangular, polygonal, and complex including convex and concave curves. Examples of alternative recess and damper shapes and sizes are shown in FIGS. 6 and 7.

Referring back to FIGS. 3-5, the shot particles 160 may have a diameter ranging from less than a millimeter to five millimeters. In one example, the particles 160 have a diameter from a half a millimeter to two millimeters. In another example, each particle 160 has a volume that is 1000 orders of magnitude smaller than the volume of the closed damper.

A predetermined amount or volume of the particles 160 are provided in the recess 162. In one example, an amount or volume of particles 160 is provided such that they fill 70-95 percent, or 80-90 percent of the volume of the closed damper 154, or up to 90 percent of the volume of the damper as a fill fraction. In other words, the 10-20 percent of the damper volume is left as unfilled space or open space.

The series of apertures 180 in the first sector 176 and the damper 154 in the second sector 178 cooperate to provide the eccentric weighting of the balance gear 46. As the first sector 176 has less structure than the second sector 178, the balance gear 46 has an increased degree of flexibility. This flexibility may result in movement of the gear 46 during rotation, and may provide second or higher order degrees of gear movement, e.g. "potato chipping" or resembling a hyperbolic paraboloid or other saddle or complex shape. As the gear 46 undergoes some degree of flexing or movement, the forces between the intermeshed teeth between the crankshaft gear and the balance gear will likewise change and vary, and whine may be increased or amplified. For a conventional counterweighted balance gear with the same weight and mass distribution as the balance gear 46 of FIGS. 3-5, modeling results indicate that the flexible modes of the gear 46 contribute to the dynamic amplification of the gear whine excitations, created at the gear mesh, and to their transmissibility to the mating components. The modeling results indication that the spectrum of measured engine balance shaft 44 gear whine noise is increased or has resonance in the 3000-4500 Hz frequency range, which corresponds to the modeling results illustrating flexible modes of the gear 46 and higher order mode shapes for the gear, or "potato chipping", in this frequency range of the whine.

Figure 8:
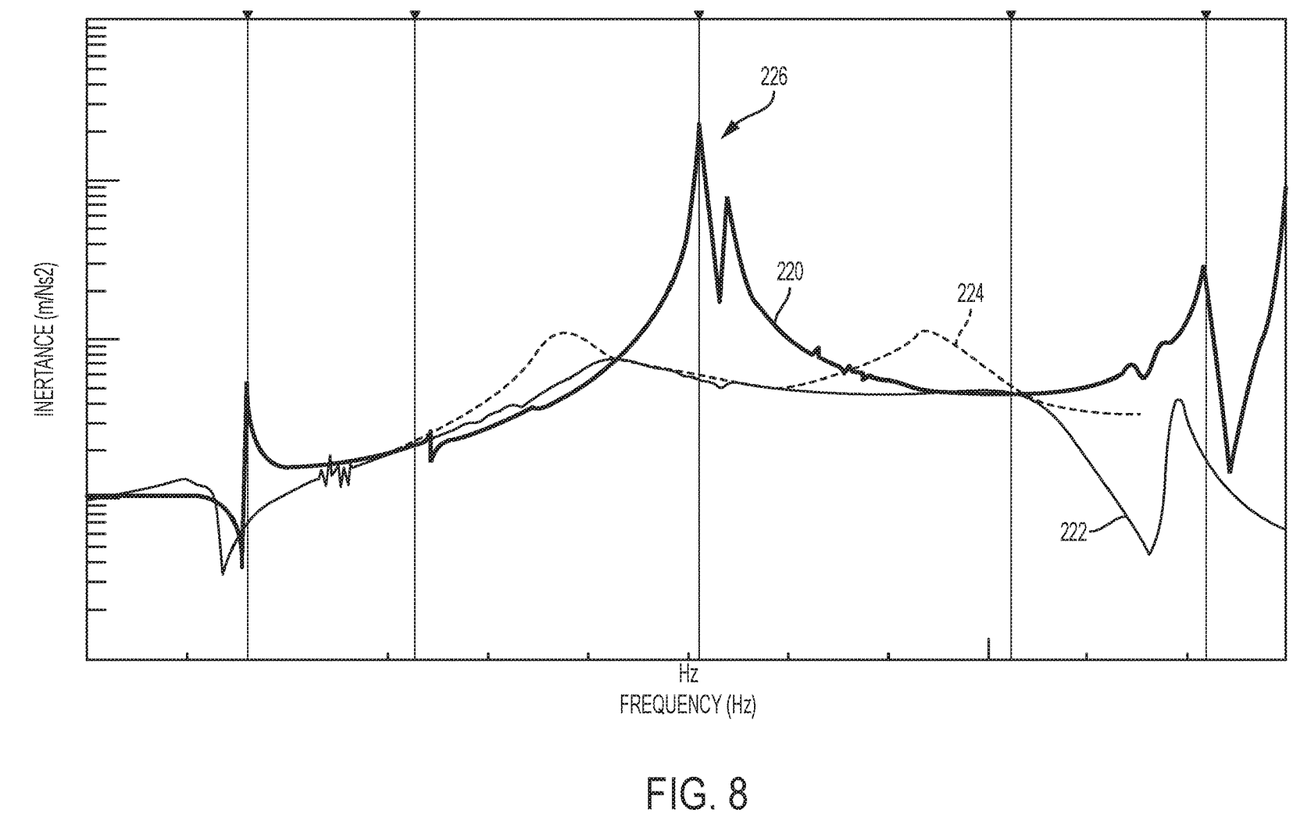
FIG. 8 is a graph providing inertance versus frequency for the balance gear of FIG. 3 in comparison with a conventional counterweighted balance gear and a balance gear having a tuned mass damper.

FIG. 8 illustrates a graph of acoustic inertance versus frequency for various counter weighted counterbalance gears based on modeling results. A conventional balance gear formed without a particle damper is shown at line 220 and is compared to the balance gear 46 of FIGS. 3-5 shown at line 222. The conventional balance gear has the same weight and mass distribution as the gear of FIGS. 3-5. As can be seen in FIG. 8, the shot damper gear at 222 provides a reduction in the peak or resonant frequency at broadband reduction in noise without the introduction of new resonant frequencies. Note that alternative ways of damping the balance gear, e.g. by attaching a tuned mass damper as shown by line 224, will reduce the central peak at 226; however, two new smaller peaks would result and the damping provided by the tuned mass damper would vary with temperature, such that temperature variations may result in one of the two peaks increasing.

The gear 46 with an integrated particle damper 154 formed in the counterweight section provides the various advantages, for example, in comparison to a gear without a damper 154 or a gear with a tuned mass damper connected thereto. For example, the performance of the shot damper 154 is generally insensitive to temperature and temperature changes, and is therefore suited for use inside the engine and at engine operating temperatures. In comparison, tuned mass dampers may be temperature sensitive. The integration of the shot damper 154 into the gear 46 does not impact the function requirements of the gear such as the gear center distance variation, gear slope, gear skew, etc. The particle damper provides for a reduction in gear whine and NVH improvement over a broadband frequency range, whereas tuned mass dampers are targeted to a narrow frequency range for NVH reduction. The integrated shot damper 154 may also be easily implemented and provide a less complex solution in comparison to other engine gear whine palliatives including engine acoustic treatments or wraps and gear micro-geometry requirements. The integrated shot damper 154 additionally does not impact packaging requirements for the gear 46 and shaft space, which may be limited, and provides the same overall weight and mass distribution as a conventional undamped counterweighted balance gear.

Figure 9:
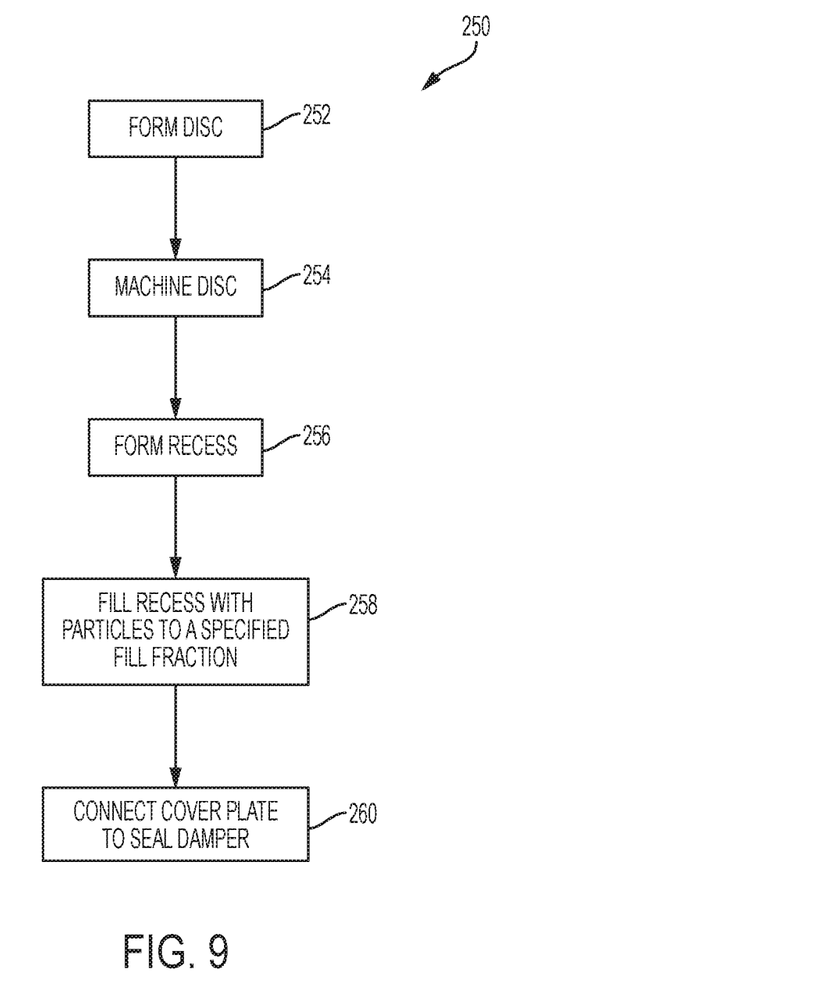
FIG. 9 illustrates a method of forming a counterbalance gear with a damper according to an embodiment.

FIG. 9 illustrates a method 250 of forming a gear such as a balance gear. The method 250 may have a greater or fewer number of steps than shown, and the steps may be rearranged to be performed in another order.

At step 252, a disc 156 is formed with first and second opposite sides 166, 168 extending radially outwardly to a circumferential edge 172. The disc may be formed by forging, die casting, net shape or near net shape die casting, investment casting, and the like. The disc may require heat treatment such as sintering, or another process. The apertures 180 in the first sector may be provided and formed when the gear is formed, as a finished surface for the apertures is not required. The apertures 180 may be formed to extend through the disc and intersect the first and second sides of the disc.

At step 254, a series of teeth 174 are formed into the circumferential edge 172 of the disc. The teeth may be formed or further defined via machining, including gear cutting, hobbing, gear shaping, milling, or broaching. The teeth of the gear may be further heat treated to increase their wear resistance and harden them. The disc 156 may additionally be machined using honing or another process to form the central aperture 170, and may be milled to form the mating face 186 of the disc. If the apertures 180 in the first sector are not formed when the disc is formed, the apertures may be machined into the first sector of the gear during this step.

At step 256, a single recess 162 for the damper 154 is formed into the disc with the recess intersecting the first side of the disc 164 and extending to a blind depth therein. The recess 162 extends adjacent to the circumferential edge of the disc such that the recess is spaced apart from the rotational axis 182 of the gear and away from the central aperture 170. The recess 162 may be formed when the gear disc is formed, e.g. during a casting process, or may be machined into the gear disc. The recess 162 is formed such that it is in the second sector of the disc and is radially opposed to the plurality of apertures 180.

At step 258, a specified volume of a plurality of shot particles 160 is provided into the recess 162 to a specified fill fraction. In one example, the fill fraction is 80 to 90 percent of the volume of the closed damper 152. The particles 160 provided are also formed with a specified diameter. In one example, the diameter is one to two millimeters. The internal volume of the damper 154, the specified fill fraction, and a diameter of shot particles 160 are sized to damp whine caused by at least second orders of distortion of the balance gear 46.

At step 260, the cover plate 184 is attached to the first side 166 of the disc to enclose the recess 162, retain the plurality of shot particles 160 therein, and form an internal damper 154 in the balance gear 46. The cover plate 184 may be welded to the disc to seal the recess and formed the damper. Alternatively, a sealing member may be provided between the cover plate 184 and the disc 156, and fasteners may be used to connect the cover plate to the disc and form the damper 154.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine system comprising:
a crankshaft gear coupled to a crankshaft of an engine for rotation therewith; and
a balance gear coupled to a balance shaft for rotation therewith, the balance gear formed by a disc having first and second opposite sides extending radially outwardly to a circumferential edge, the circumferential edge defining a series of teeth extending between the first and second sides, the series of teeth of the disc of the balance gear in meshed engagement with the crankshaft gear, a first sector of the disc having at least one aperture therethrough, the at least one aperture intersecting the first and second sides of the disc, and a second opposite sector of the disc defining a recess intersecting the first side, the balance gear having a damper comprising a cover plate connected to the first side of the disc to enclose the recess and contain a plurality of particles therein, wherein the at least one aperture is empty such that the balance gear is eccentrically weighted by the damper and the at least one aperture.

2. The engine system of claim 1 wherein the balance shaft has an eccentric weight connected thereto for rotation therewith; and
wherein the damper of the balance gear is radially opposite to the eccentric weight.

3. The engine system of claim 1 further comprising a sealing member positioned between the cover plate and the disc to seal the recess.

4. The engine system of claim 1 wherein the cover plate and recess cooperate to define a volume for the damper; and
wherein the plurality of particles fills between eighty and ninety percent of the volume.

5. The engine system of claim 1 wherein the plurality of particles comprises steel shot.

6. A balance gear for a vehicle shaft comprising:
a disc having first and second opposite sides extending radially outwardly to an edge defining a series of teeth, the disc having a first sector defining at least one aperture therethrough and a second sector defining a recess intersecting the first side;
a plurality of particles positioned in the recess; and a cover plate connected to the first side of the disc to enclose the recess, wherein the cover plate, the recess, and the plurality of particles cooperate to form a damper for the balance clear;

wherein the at least one aperture intersects the first and second opposite sides of the disc and remains empty such that the balance clear is eccentrically weighted by the damper and the at least one aperture.

7. The balance gear of claim 6 wherein the first sector and the second sector are opposed to one another such that the balance gear is counterweighted.

8. The balance gear of claim 6 wherein the first sector provides a first half disc, and the second sector provides a second half disc.

9. The balance gear of claim 6 wherein the recess and the cover plate cooperate to define a volume therebetween.

10. The balance gear of claim 9 wherein the volume is in a range of 10-40 percent of the volume of the second sector.

11. The balance gear of claim 10 wherein each particle in the plurality of particles has a diameter 1000 orders of magnitude smaller than the volume.

12. The balance gear of claim 9 wherein the plurality of particles is provided to fill between seventy and ninety percent of the volume.

13. The balance gear of claim 6 wherein an outer surface of the cover plate and the first side of the disc are coplanar with one another.

14. The balance gear of claim 6 wherein the disc defines the recess with an end wall and a side wall, the end wall spaced apart from the second side of the disc, the side wall intersecting the first side of the disc.

15. The balance gear of claim 14 wherein the end wall extends parallel to the second side of the disc.

16. The balance gear of claim 6 wherein the recess is the sole recess in the disc receiving particles and enclosed by the cover plate.

17. A method of forming a balance gear for a vehicle balance shaft comprising:

forming a disc having first and second opposite sides extending radially outwardly to a circumferential edge;

forming a series of teeth on the circumferential edge;

forming a single recess into the disc, the recess intersecting the first side of the disc and extending to a blind depth therein, the recess extending adjacent to the circumferential edge;

forming at least one aperture in the disc, the at least one aperture intersecting the first and second sides of the disc such that the at least one aperture extends through the disc, and the at least one aperture being radially opposed to the recess;

providing a plurality of shot particles into the recess to a specified fill fraction; and attaching a cover plate to the first side of the disc to enclose the recess, retain the plurality of shot particles therein, and form an internal damper in the balance gear;

wherein a volume of the internal damper, the specified fill fraction, and a diameter of shot particles are sized to damp whine caused by at least second orders of distortion of the balance gear; and wherein the at least one aperture is empty such that the balance gear is eccentrically weighted by the internal damper and the at least one aperture.

18. The method of claim 17 further comprising positioning a sealing member between the cover plate and the disc to seal the recess.

19. The engine system of claim 1 wherein the recess is the sole recess in the disc receiving particles and enclosed by the cover plate.

* * * * *